United States Patent [19]

Choi et al.

[11] Patent Number: 5,486,958
[45] Date of Patent: Jan. 23, 1996

[54] VIDEO CASSETTE TAPE RECORDER WITH SINGLE LOADING MOTOR, ACTUATING PLATE AND FAST WINDING PLATE

[75] Inventors: Jeong D. Choi; In K. Cheon, both of Seoul; Geun H. Song, Kyungki; Hee Y. Park, Seoul, all of Rep. of Korea

[73] Assignee: Goldstar Co., Ltd., Seoul, Rep. of Korea

[21] Appl. No.: 153,899

[22] Filed: Nov. 17, 1993

[30] Foreign Application Priority Data

Nov. 21, 1992 [KR] Rep. of Korea ............... 21990/1992
Nov. 21, 1992 [KR] Rep. of Korea ............... 23016/1992

[51] Int. Cl.⁶ ............................................. G11B 5/027
[52] U.S. Cl. ....................................... 360/85; 360/95
[58] Field of Search ............................ 360/84, 85, 95, 360/96.3, 93

[56] References Cited

U.S. PATENT DOCUMENTS 4,704,643  11/1987  Matsuoka et al. ................. 360/71
4,792,871  12/1988  Hütter ................................ 360/85
4,796,116   1/1989  Kwon et al. ....................... 360/85
5,159,507  10/1992  Tamura et al. .................... 360/85
5,172,283  12/1992  Fukuyama et al. ................ 360/85

*Primary Examiner*—Stuart S. Levy
*Assistant Examiner*—William J. Klimowicz

[57] ABSTRACT

A video cassette tape recorder capable of driving various functional parks by a single loading motor, thereby obtaining a light, thin, simple and compact construction and reducing the manufacture cost. A construction is provided in which a single loading motor drives a rotation head drum mounted on a rear portion of a base plate, an actuating plate mounted on a bottom surface of the base plate to linearly laterally move between a supply reel and a take-up reel both mounted on a front portion of the base plate, a pinch drive assembly disposed on one side of the take-up reel and adapted to drive the pinch roller, and a front loading housing.

12 Claims, 17 Drawing Sheets

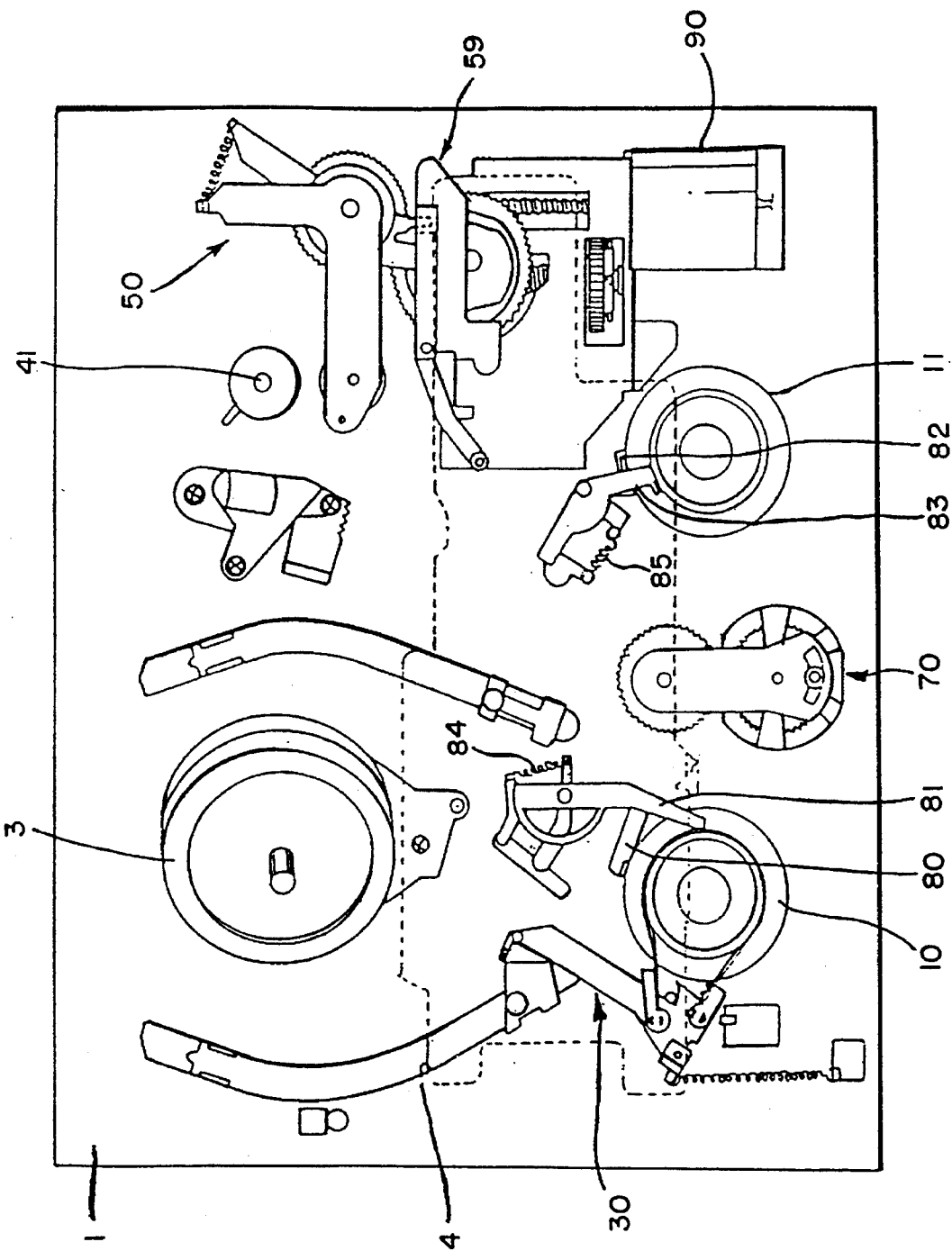

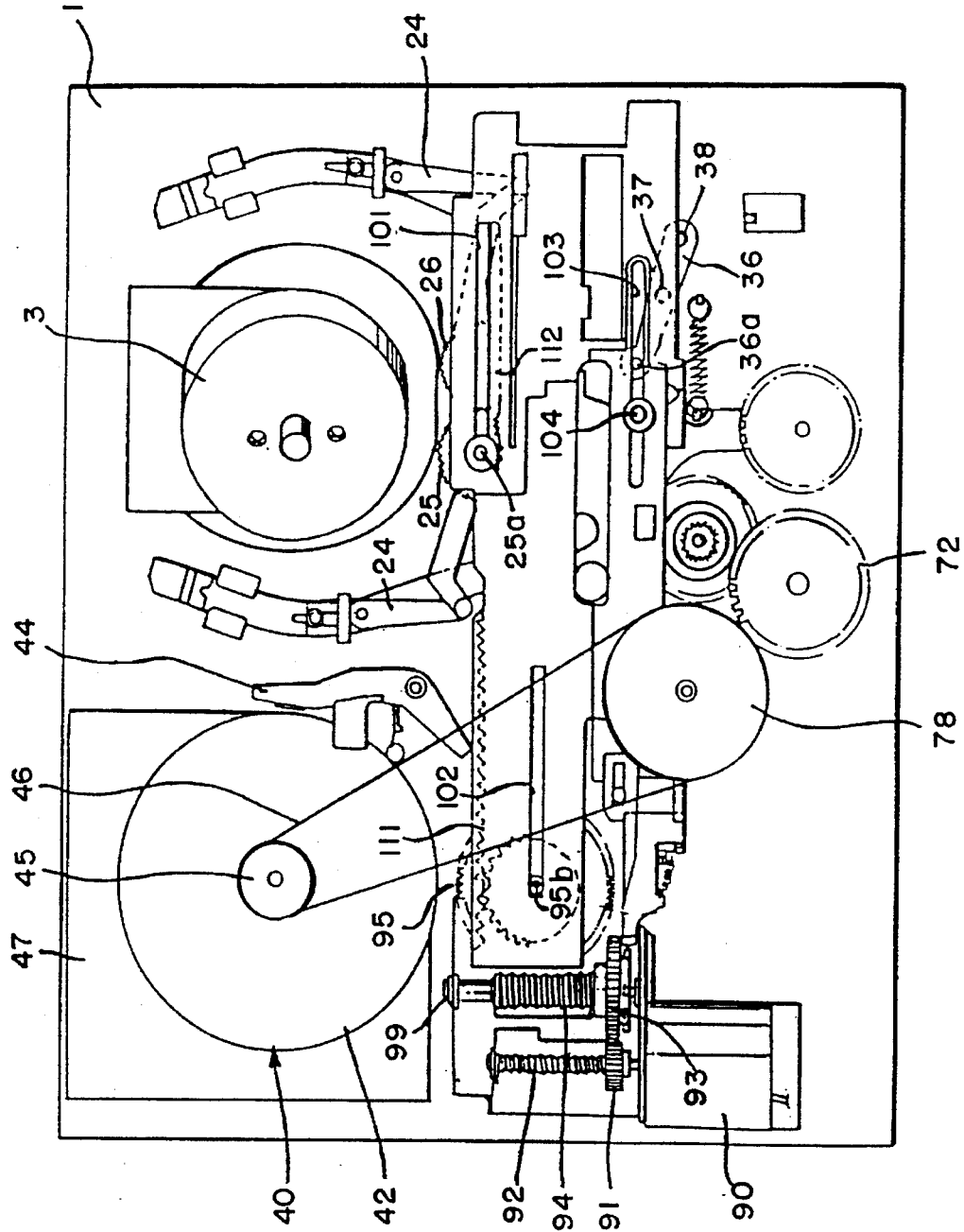

VIDEO CASSETTE TAPE RECORDER WITH SINGLE LOADING MOTOR, ACTUATING PLATE AND FAST WINDING PLATE

BACKGROUND OF THE INVENTION

1'. Field of the Invention

The present invention relates to a video cassette tape recorder and more particularly to a video cassette tape recorder having a single loading motor capable of driving various elements of a tape travelling system.

2. Description of the Prior Art

In deck mechanisms of conventional video cassette tape recorders, a drive power from a loading motor is transmitted to a cam gear mounted at a middle portion of a base plate via a plurality of gears. An actuating plate adapted to move tape take-out and travel guiding elements is driven by a cam gear having a curved cam groove. For driving a loading gear, a sector gear is disposed between the cam gear and the loading gear.

A pinch roller is let is also provided which is adapted to feed a tape along a tape travelling path by its rotation while being in contact with a capstan shaft. The pinch roller is mounted to a pinch arm pivotally mounted to the base plate so as to move between a mouth of a tape cassette and the capstan shaft. The pinch arm is operatively connected with the curved cam groove of the cam gear.

Conventional video cassette tape recorders use a separate motor only for driving a front loading mechanism adapted to seat the tape cassette on a reel table disposed in a deck. Another separate motor is further used only for threading the tape after completion of seating the tape cassette on the reel table. Although a construction for driving the front loading housing by use of the driving power of the loading motor in loading of the tape has been known, it utilizes a complex power switching mechanism.

Conventional video cassette tape recorders also include a mode switch unit and a tape loading driving unit separated from the mode switch unit. Such a separated construction requires a large installation area and a complicated signal processing.

As a result, conventional video cassette tape recorders have a complex construction using a number of elements, resulting in disadvantages of an increase in manufacture cost and a difficulty to provide a light, thin, simple and compact construction.

SUMMARY OF THE INVENTION

Therefore, an object of the invention is to provide a video cassette tape recorder capable of driving various functional parts by a single loading motor, thereby obtaining a light, thin, simple and compact construction and reducing the manufacture cost.

In accordance with the present invention, a construction is provided in which a single loading motor drives a rotation head drum mounted on a rear portion of a base plate, an actuating plate mounted on a bottom surface of the base plate to linearly laterally move between a supply reel and a take-up reel both mounted on a front portion of the base plate, a pinch drive assembly disposed in one side of the take-up reel and adapted to drive said pinch roller, and a front loading housing.

In accordance with the present invention, the construction comprises a first spur gear provided at a shaft of the loading motor, a first worm integral with the first spur gear, the first worm being operatively connected with the front loading housing, a second spur gear provided at a shaft mounted to the base plate disposed in parallel to the shaft of the loading motor, the second spur gear being engaged with the first spur gear, and a second worm integral with the second spur gear. The second worm is disposed between the base plate and the actuating plate and engaged with an actuating gear rotatably mounted to a lower surface of the base plate, the actuating gear having a larger gear and a smaller gear integral with the larger gear. The smaller gear of the actuating gear has teeth partially formed at a circumferential surface of the smaller gear and operatively connected with the actuating plate, and the larger gear of the actuating gear is operatively connected with the pinch drive assembly.

A guide post is mounted to one end of a pinch arm supporting said pinch roller so as to guide a back surface of said tape in one side of said capstan shaft. As the pinch arm pivots by the pinch drive assembly and comes into contact with the capstan shaft, the guide post comes into contact with the back surface, namely, the surface opposite to the recording surface of the tape in one side of the capstan shaft. As a result, the tape is guided without a damage.

In accordance with the present invention, the mode switch unit for sensing an operation mode and the driving unit for moving each element of the travelling system between a tape threaded position and a tape unthreaded position are assembled on the single base plate so as to constitute a single assembly. Accordingly, the assembling work can be easily achieved.

In accordance with the present invention, the base plate has an upper bent portion supporting a pulley gear for transmitting said capstan motor and a lower bent portion supporting the idler mechanism. By this construction, the height of the construction can be reduced.

Furthermore, most of the elements of the travelling system constituting the deck mechanism are mounted on the base plate. The rotation head drum is mounted on the base plate by means of a head base. As mentioned above, the mode sensing and driving units are also mounted on the base plate. By these arrangements, the construction is simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings in which:

FIGS. 1 to 22 illustrate a construction of a video cassette tape recorder in accordance with the present invention and its operation, respectively;

FIG. 1 is a schematic plan view of the overall construction;

FIG. 2 is a perspective plan view of the overall construction;

FIG. 3 is a perspective bottom view of the overall construction;

FIG. 4 is a plan view of the overall construction;

FIG. 5 is a bottom view of the overall construction;

FIG. 8 is a sectional front view of FIGS. 6A and 6B;

FIG. 10 is a partial sectional view of the ratchet;

FIG. 11 is an exploded perspective view of a jog clutch gear;

FIG. 12 is an assembled sectional view of the jog clutch

FIG. 13 is a plan view of a tension adjusting mechanism;

FIG. 15 is a side view of a front loading housing and its driving unit;

FIG. 16 is a plan view of a take-up arm having a gear portion;

FIG. 17 is a sectional view of an idler mechanism;

FIG. 19 is a perspective view of an actuating plate;

FIG. 21 illustrates various positions of brake-actuating protrusions respectively corresponding to various operation modes; and FIG. 22 is a graph showing the progress of operation modes.

DESCRIPTION OF THE PREFERRED EMBODIMENTS

Figure 1:
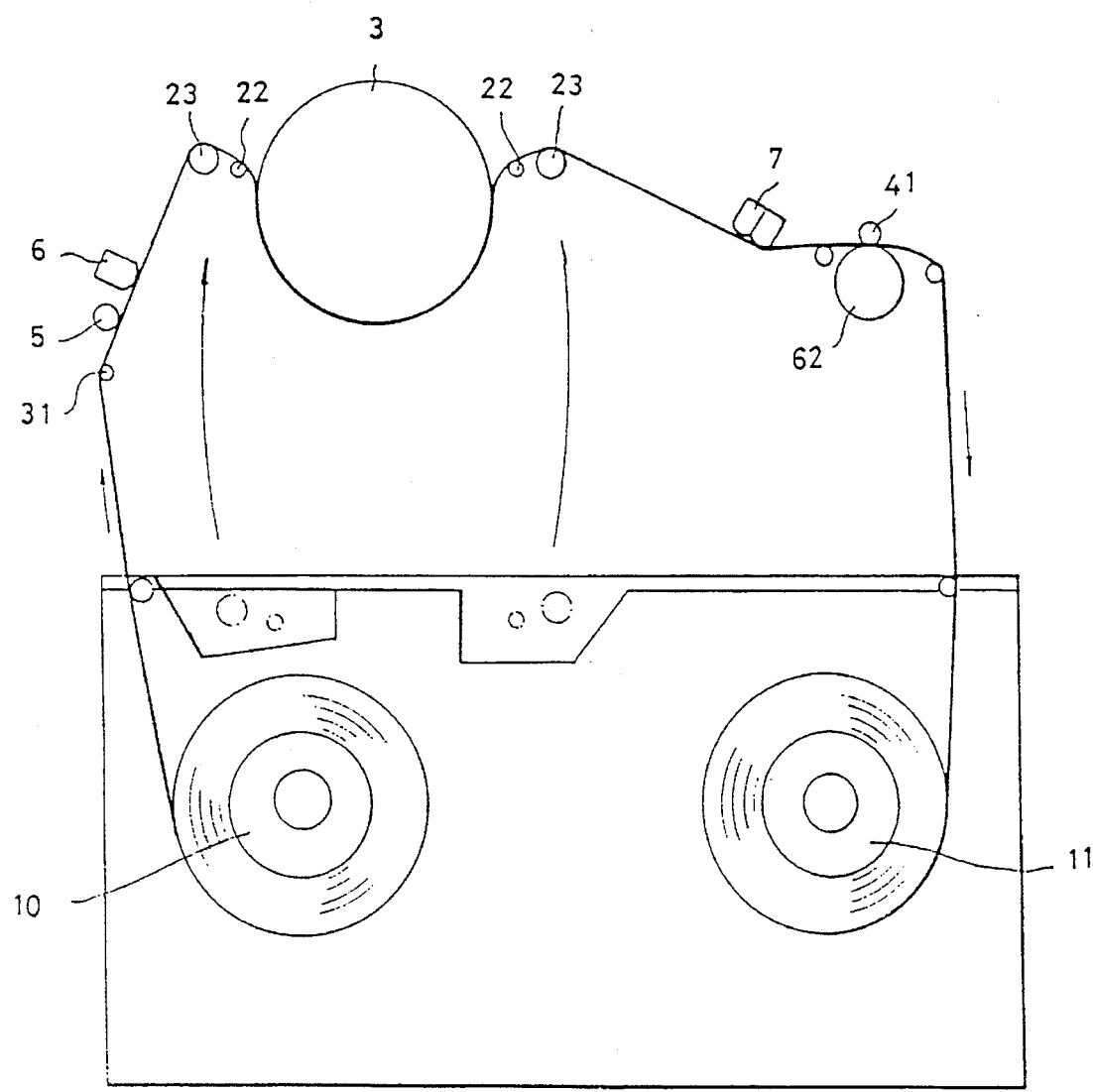
Figure 2:
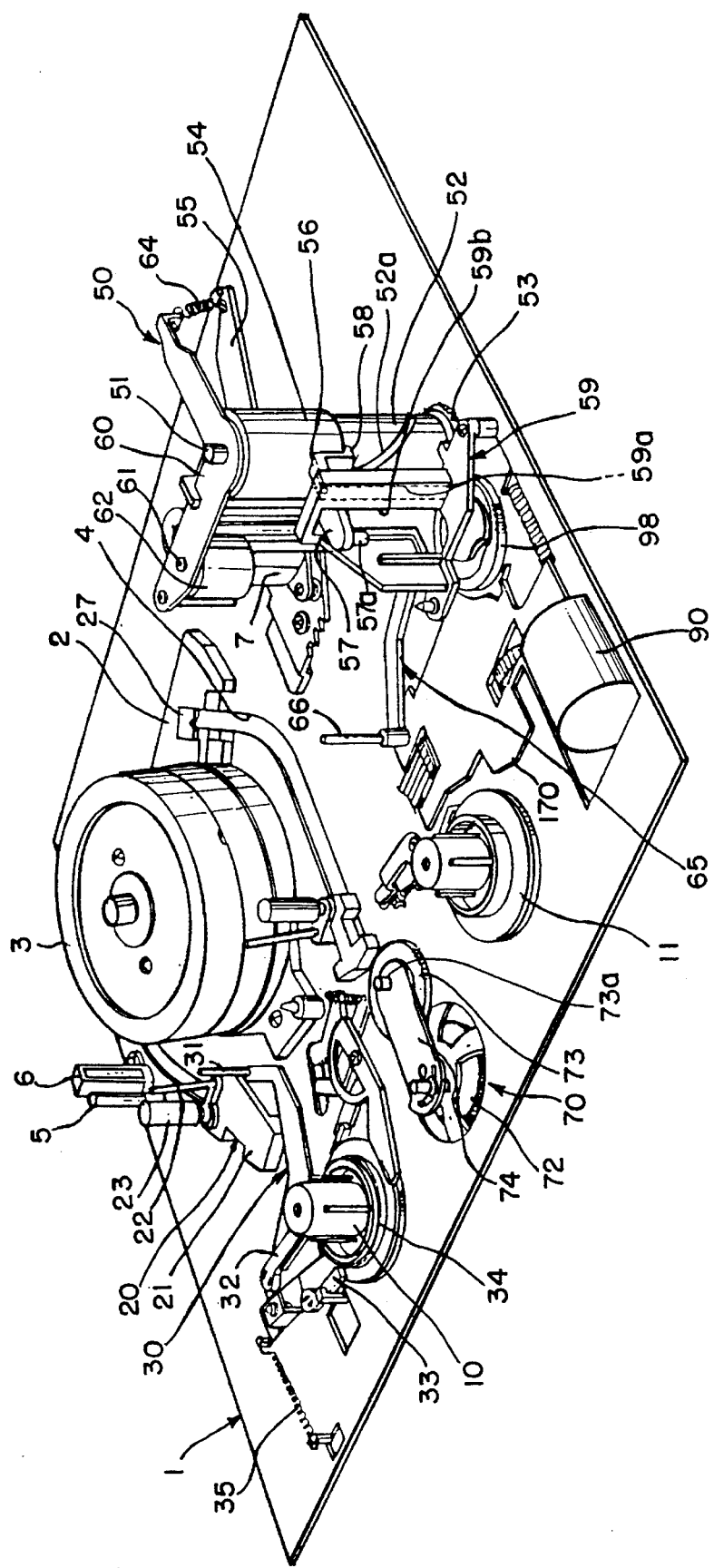
Figure 3:
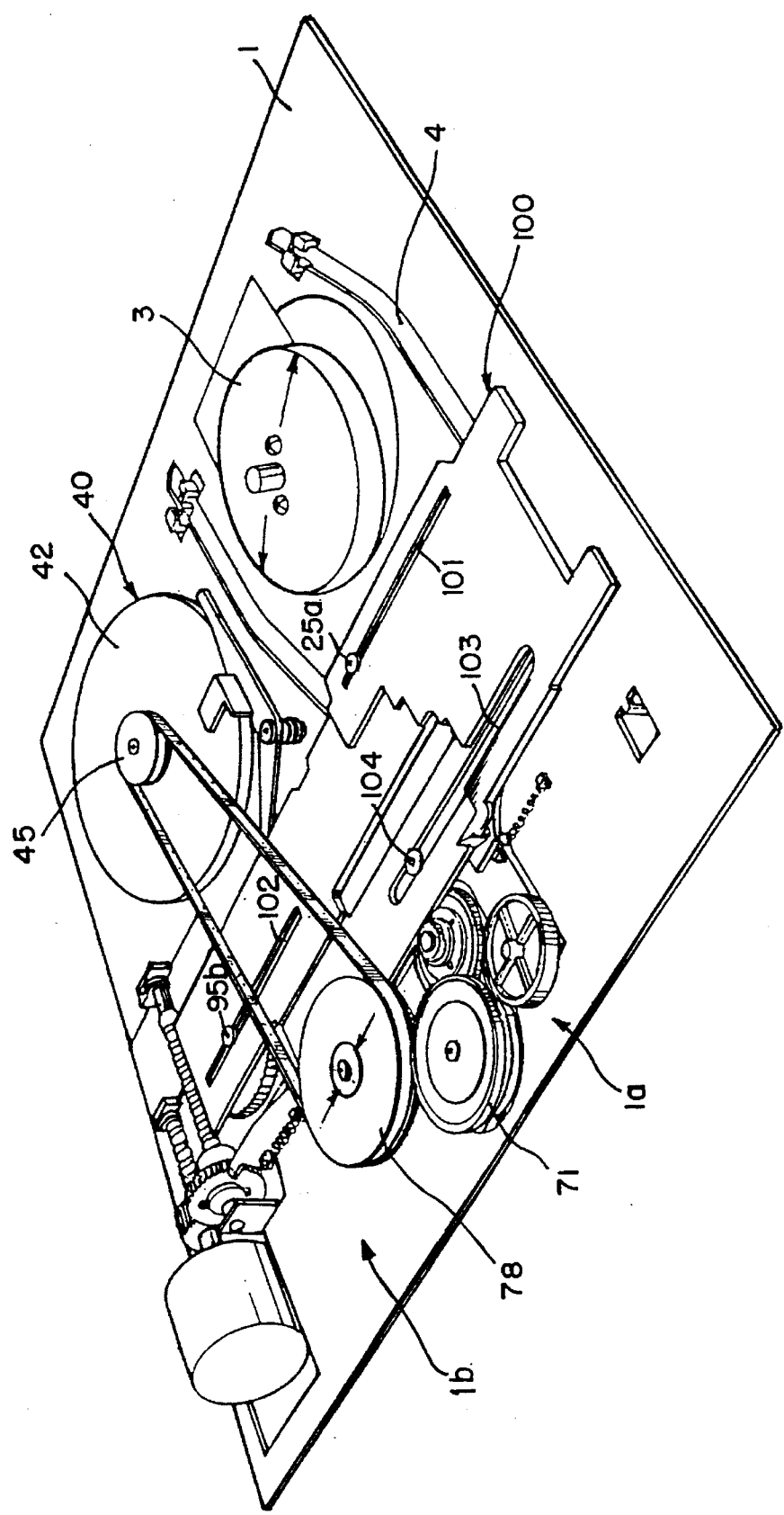

FIG. 1 is a schematic plan view of the overall construction of a VCR deck mechanism in accordance with the present invention. FIG. 2 is a perspective plan view of the VCR deck mechanism of FIG. 1. FIG. 3 is a perspective bottom view of the VCR deck mechanism of FIG. 1. FIG. 4 is a plan view of the VCR deck mechanism of FIG. 1. FIG. 5 is a bottom view of the VCR deck mechanism of FIG. 1. As shown in the drawings, the deck mechanism includes a base plate 1 and a head base 2 fixedly mounted to the rear portion of the base plate 1. A rotation head drum 3 is slantly mounted on the head base 2. At the front portion of the base plate 1, a supply reel 10 and a take-up reel 11 are disposed to be spaced from each other. In both sides of the head drum 3, a pair of loading guide slots 4 are formed in the base plate 1, respectively.

A guide roller 5 and an erase head 6 are disposed on one side of the head drum 3. On the other side of the head drum 3, an audio control head assembly 7 is disposed.

As shown in FIG. 2, a slant post assembly 20 is received in each loading guide slot 4 to slide along the loading guide slot 4 forwardly and rearwardly.

Each slant post assembly 20 includes a slant post base 21 coupled to the loading guide slot 4, a slant post 22 mounted on the slant post base 21, and a guide roller 23 mounted on the slant post base 21. As shown in FIG. 5, the slant post assemblies 20 are connected to a first loading gear 25 and a second loading gear 26 both rotatably mounted to the base plate 1, by means of link type loading arms 24, respectively.

In one side of the supply reel 10, a tension adjusting mechanism 30 is disposed which includes a tension adjusting arm 31 pivotally mounted at one end thereof to the base plate 1 and a tension adjusting post 31a fixedly mounted to the other end of the tension adjusting arm 31, as shown in FIG. 2. A capstan motor 40 having a capstan shaft 41 (FIG. 4) and a capstan rotor 42 (FIG. 5) is disposed in one side of the audio control head assembly 7, as shown in FIG. 3. In one side of the capstan motor 40, a pinch arm 60 is pivotally mounted to a shaft 51 fixed to the base plate 1, as shown in FIG. 2. The pinch arm 60 has a pinch roller 62 rotatably mounted to one end, namely, the front end of the pinch arm 60 and a tape guide pin 63 mounted to the front end of the pinch arm 60 forwardly of the pinch roller 62.

As shown in FIG. 2, a take-up arm 65 is connected at one end thereof to the pinch arm 60. A take-up post 66 is mounted to the other end of the take-up arm 65.

In side of the supply reel 10, a supply-side main brake 80 and a supply-side soft brake 81 are disposed, as shown in FIG. 4. These brakes 80 and 81 are connected to each other by means of a supply-side brake spring 84. In similar, a take-up-side main brake 82 and a take-up-side soft brake 83 are disposed in side of the take-up reel 11 and connected to each other by means of a take-up-side brake spring 85.

In the rear end of each loading guide slot 4, a V-shaped stopper 27 is fitted which serves to stop a movement of the corresponding slant post assembly 20, as shown in FIG. 2.

A tension band 34 is connected at both ends thereof to the tension adjusting arm 31 by means of a first connecting lever 32 and a second connecting lever 33, respectively. The tension band 34 is wrapped around the outer circumferential surface of the supply reel 10. To the tension adjusting arm 30, a tension spring 35 is also connected at one end thereof. The other end of the tension spring 35 is fixedly mounted to the base plate 1.

As shown in FIG. 5, a tension transmission lever 36 adapted to drive the tension adjusting arm 31 is pivotally mounted at one end thereof to the base plate 1 to pivot about a pin 36a. The tension transmission lever 36 has at the other end thereof a protrusion 38 for forcing the tension transmission lever 36 to pivot.

The capstan motor 40 fixedly mounted to the lower surface of the base plate 1 is electrically connected to a circuit board 47. As shown in FIG. 4, the capstan shaft 41 of the capstan motor 40 is protruded upwardly of the base plate 1 and has a lower end to which a pulley 45 is fixedly mounted (FIG. 3). A capstan brake 44 is disposed near the capstan motor 40 to selectively come into contact with the capstan rotor 42. The pulley 45 is integral with the capstan rotor 42.

An idler mechanism 70 is mounted on the base plate 1 between the supply reel 10 and a take-up reel 11. As shown in FIGS. 2 to 4 and FIG. 17, the idler mechanism 70 includes an output gear 72 rotatably mounted on a shaft 75a fixed to the base plate 1, a holder 78 rotatably mounted on the shaft 75a beneath the output gear 72. The holder 78 has a hollow shaft portion fitted at its upper end in a hollow shaft portion of the output gear 72. Around the shaft portion of holder 78, a clutch gear 71 including a upper gear 71a and a lower gear 71b is rotatably mounted between the output gear 72 and the holder 78. The idler mechanism 70 further includes an idler gear 73 rotatably mounted to one end of an idler arm 74 pivotally mounted on the shaft 73a. The idler gear 73 is engaged with the output gear 72. Felts 75 and 76 are interposed between the holder 79 and the lower gear 71b and between the lower gear 71b and the upper gear 71a, respectively. A compression coil spring 77 is disposed around the shaft portion of the output gear 72 between the output gear 72 and the upper gear 71a.

As shown in FIG. 3, the base plate 1 is cut at its portion disposed between the supply reel 10 and the take-up reel 11 to provide a lower bent portion 1a and an upper bent portion 1b. The idler mechanism 70 is laid on the lower bent portion 1a of the base plate 1. To the upper bent portion 1b of the base plate 1, a pulley gear 78 is mounted to extend downwardly of the upper bent portion 1b. By this construction, the height of the deck mechanism can be reduced to achieve a compactness of an appliance equipped with the deck mechanism.

The pulley gear 78 rotatably mounted to the lower surface of base plate 1 is engaged with the lower gear 71a of the clutch gear 71 and connected with the pulley 45 of the capstan rotor 42 by a belt 46.

A pinch drive assembly 50 is provided for driving the pinch roller 62 between a tape threaded position and a tape unthreaded position, as shown in FIG. 2. The pinch drive assembly 50 includes a rotatable cylindrical cam 52 having a spiral cam groove 52a at its outer circumferential surface, an input gear 53 formed at the lower end of the cylindrical cam 52, a reciprocating cylinder 54 fitted around the cylindrical cam 52 to move upwardly or downwardly according to a rotation of the cylindrical cam 52, and a pinch roller actuating gear 98 engaged with the input gear 53 to rotate the cylindrical cam 52.

The cylindrical cam 52, the reciprocating cylinder 54 and the pinch arm 60 are coupled, in this order, to the shaft 51. A support lever 55 is provided at the upper end of the reciprocating cylinder 54. The support lever 55 is connected with the other end, namely, the rear end of the pinch arm 60 by a tension coil spring 64, as shown in FIG. 2.

The reciprocating cylinder 54 has at its lower end a guide protrusion 56, a cam lever 57 and a cam protrusion 58, as shown in FIG. 2. The cam protrusion 58 is engaged in the spiral cam groove 52a of the cylindrical cam 52. The guide protrusion 56 is engaged in a guide groove 59a of a guide and support member 59 fixedly mounted to the base plate 1 in one side of the reciprocating cylinder 54 and adapted to guide a reciprocating movement of the reciprocating cylinder 54. The cam lever 57 extends through a guide hole 59b of the guide and support member 59.

The cam lever 57 of the reciprocating cylinder 54 is provided at its free end with a cam pin 57a engaged in a pressing cam groove 98c (FIGS. 18A and 18B) formed at the pinch roller actuating gear 98.

Figure 18A:
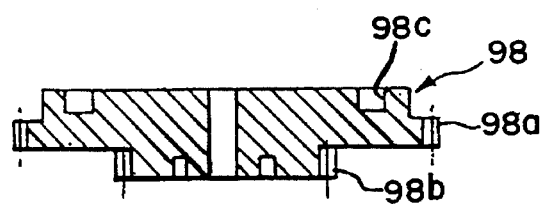
FIG. 18A is a sectional view of a pinch roller actuating gear.
Figure 18B:
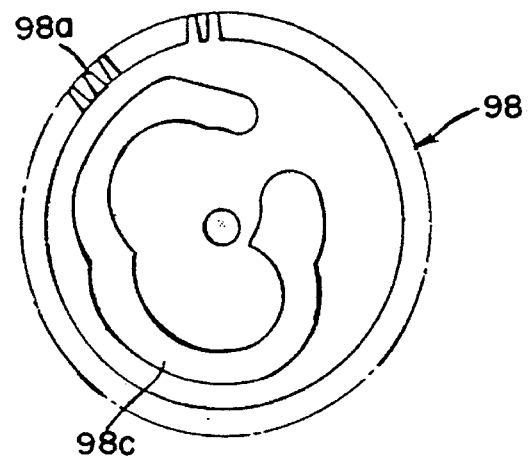
FIG. 18B is a plan view of the pinch roller actuating gear.

As shown in FIG. 2 and FIGS. 18A and 18B, the pinch roller actuating gear 98 includes a larger gear portion 98a and a smaller gear portion 98b integral with the larger gear portion 98a. The larger gear portion 98a of the pinch roller actuating gear 9B is engaged with the input gear 53 of the cylindrical cam 52. As mentioned above, the pinch roller actuating gear 98 further includes the pressing cam groove 98c in which the cam pin 57a of the cam lever 57.

The take-up arm 65 supporting the take-up post 66 at the other end thereof is provided at one end thereof with a gear portion 67 engaged with the pinch roller actuating gear 98.

Figure 16:
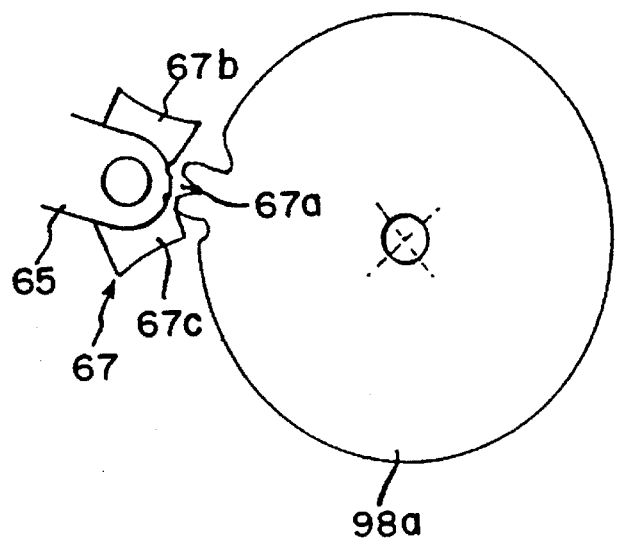
Figure 17:
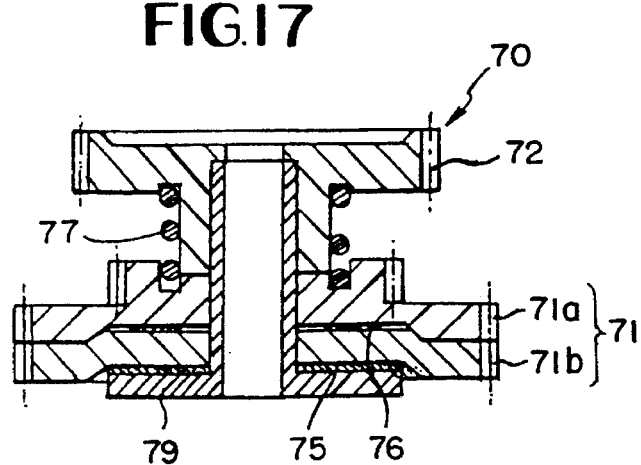

As shown in FIG. 16, the gear portion 67 of the take-up arm 65 includes a tooth 67a and a pair of arc-shaped contacts 67b and 67c disposed in both sides of the tooth 67a. By this construction of the gear portion 67, the take-up post 66 of the take-up arm 65 is moved through a predetermined angle and then maintained at the moved position when the pinch roller 62 of the pinch arm 60 moves to its tape threaded position by a rotation of the pinch roller actuating gear 98 in one direction. In similar, when the pinch roller 62 of the pinch arm 60 moves to its tape unthreaded position by a rotation of the pinch roller actuating gear 98 in the reverse direction, the take-up post 66 is reversely moved from the abovementioned position through a predetermined angle and then maintained at the moved position.

At the lower surface of the base plate 1, an actuating plate 100 is disposed, as shown in FIG. 3. The actuating plate is adapted to move tape take-out and travel guiding elements such as the slant post assemblies 20, the pinch roller 62 and the take-up post 66 between their tape threaded and unthreaded positions and convert the operation mode. A loading motor 90 is fixedly mounted to the base plate 1 in right side of the take-up reel 11.

Figure 6A:
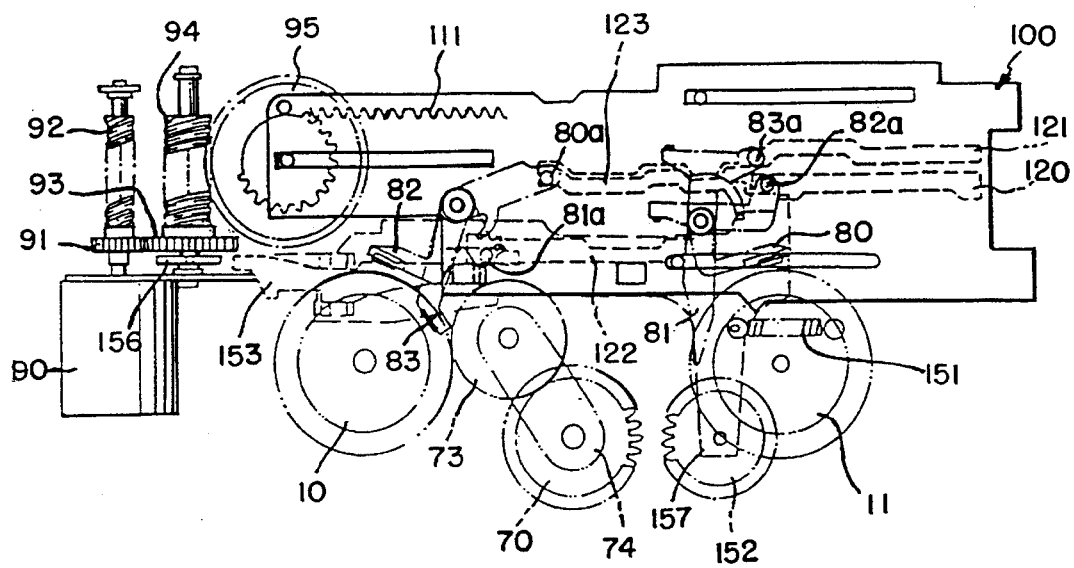
FIGS. 6A and 6B are a bottom view of a mode change unit, showing its tape unloading condition.
Figure 6B:
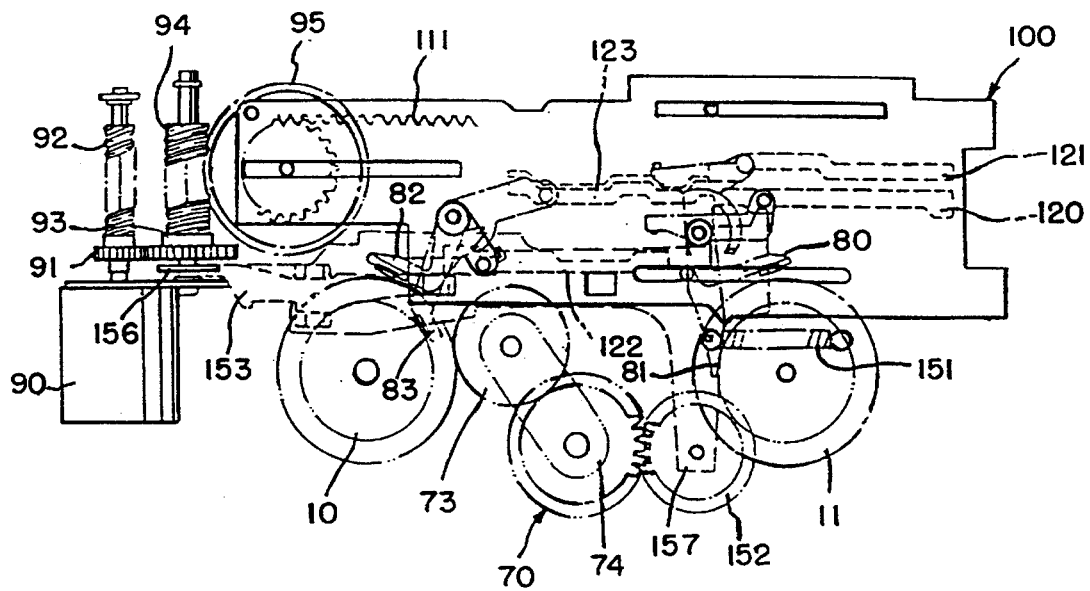
Figure 7A:
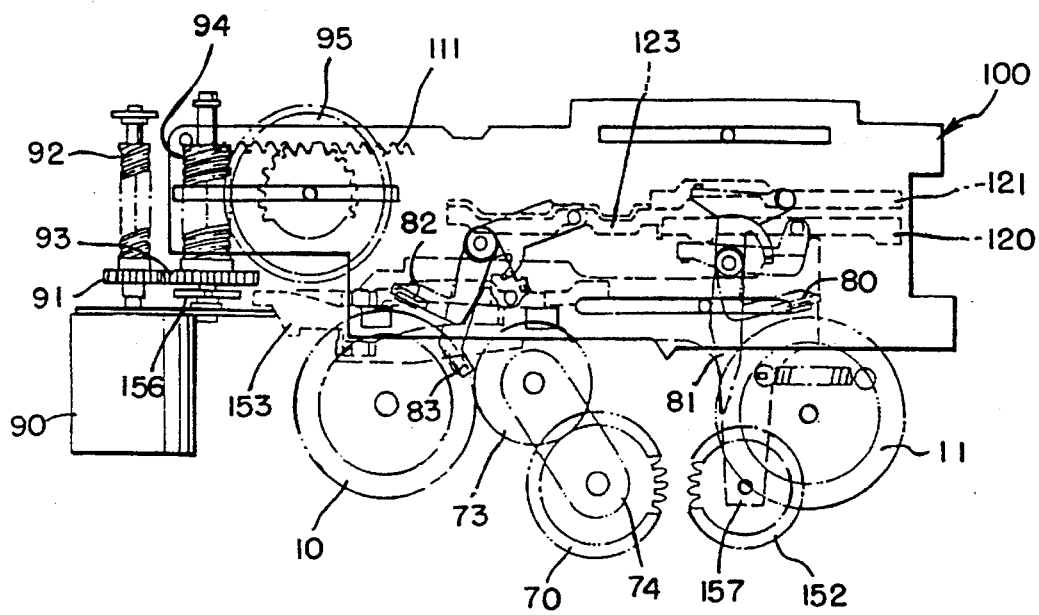
FIGS. 7A and 7B are a bottom view of the mode change unit, showing its fast winding mode condition.
Figure 7B:
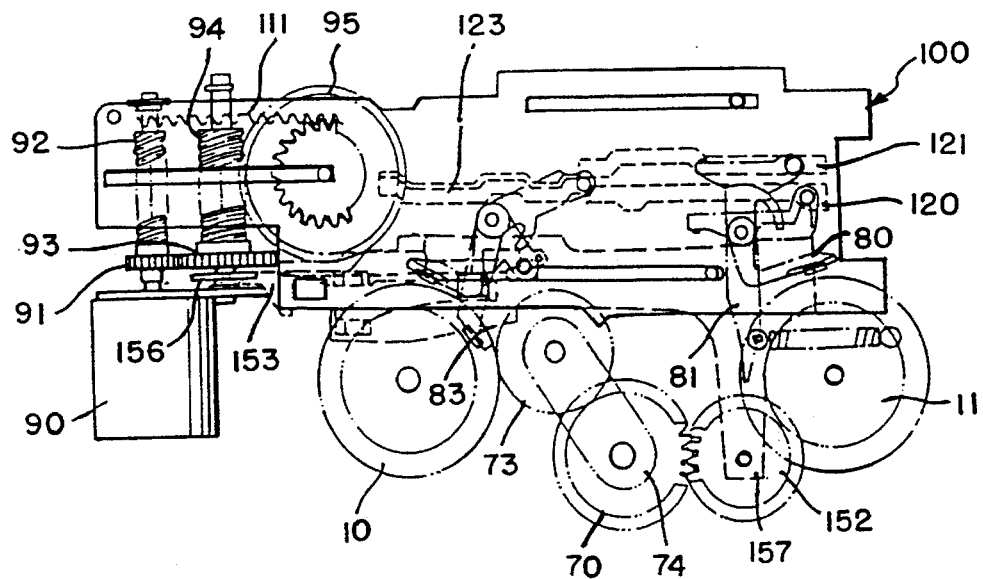

As shown in FIG. 5, the loading motor 90 has a shaft provided with a first spur gear 91 and a first worm 92 integral with the first spur gear 91. Disposed in parallel to the shaft of loading motor 90 are a second spur gear 93 and a second worm 94 integral with the second spur gear 93. The second spur gear 93 is engaged with the first spur gear 91. The second worm 94 is disposed between the base plate 1 and the actuating plate 100 and engaged with an actuating gear 95 rotatably mounted to the lower surface of base plate 1, as shown in FIGS. 6 and 7.

Figure 14A:
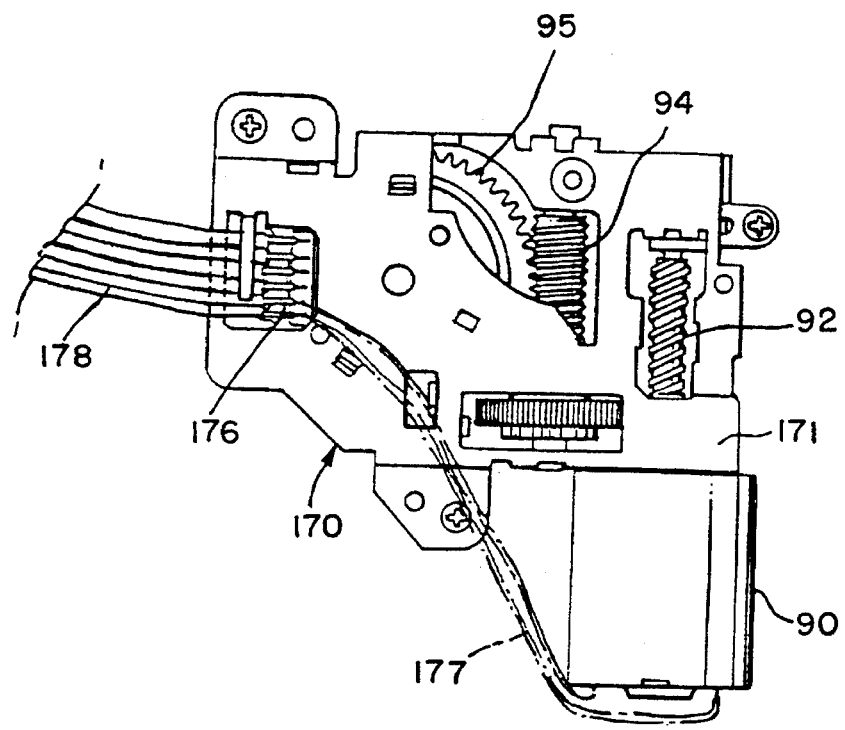
FIG. 14A is a plan view of a mode sensing and driving assembly.
Figure 14B:
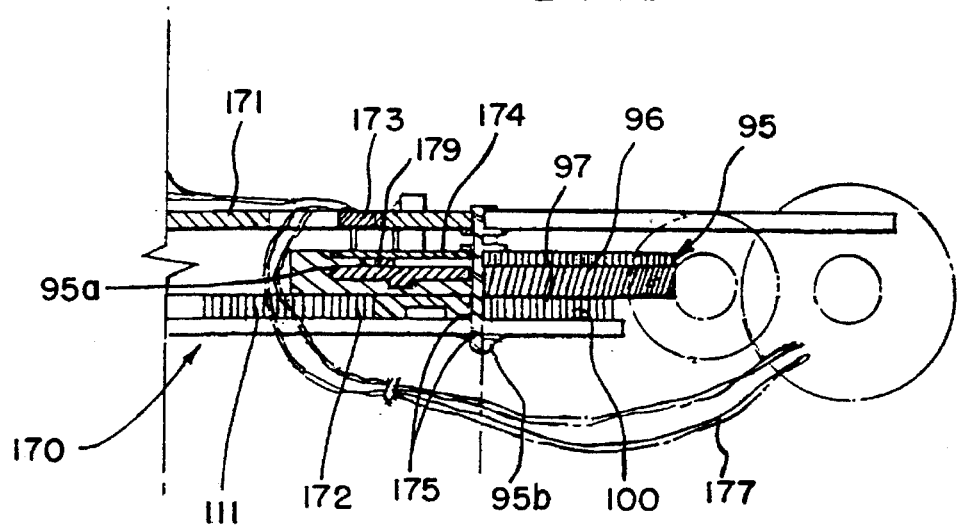
FIG. 14B is a sectional view of the mode sensing and driving assembly.

As shown in FIG. 14B, the actuating gear 95 has a larger gear 96 and a smaller gear 97 both integrally formed therewith. The smaller gear 97 has teeth partially formed at its circumferential surface. The larger gear 96 of the actuating gear 95 is engaged with the smaller gear portion 98b of the pinch roller actuating gear 98.

Figure 15:
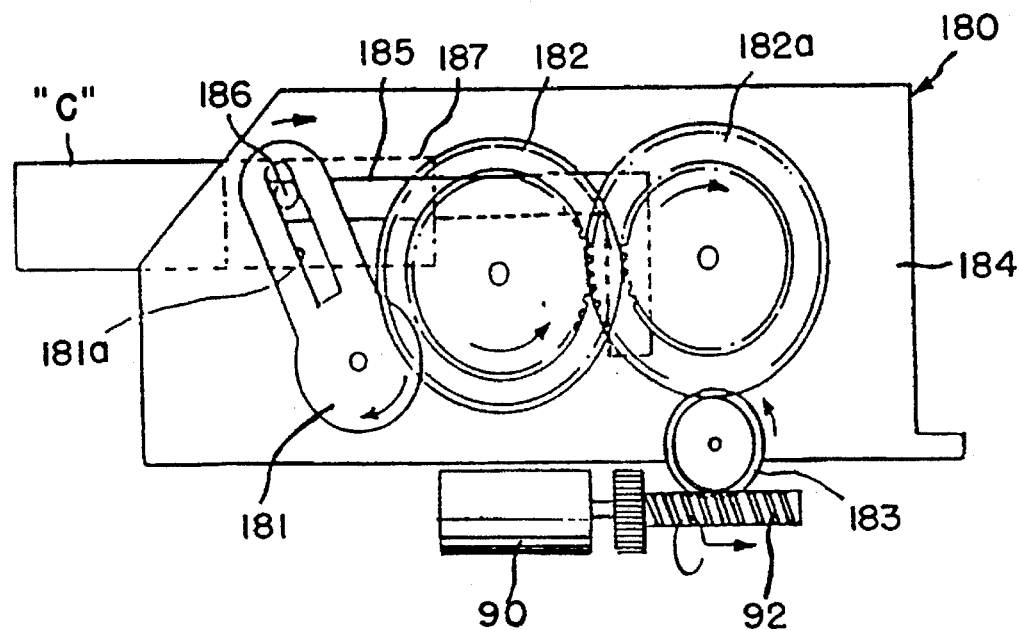

On the base plate 1, a front loading housing 180 for a tape cassette C is installed, as shown in FIG. 15.

The front loading housing 180 includes a pair of parallel brackets 184 fixedly mounted to both side portions of the base plate 1, respectively, and each having a 180°20′-turned L-shaped guide slot 185, an arm gear 181 having a guide slot 181a, a transmission idler gear 182 engaged with the arm gear 181, a transmission gear 182a engaged with the transmission idler gear 182, a worm gear 183 engaged with the transmission gear 182a and the first worm 92 of the loading motor 90, and a cassette holder 187 mounted between the brackets 184 to move horizontally and vertically along the guide slots 185 of the brackets 184 and having a pair of guide pin 186 respectively engaged in the guide slots 185. All the arm gear 181, the transmission idler gear 182, the transmission gear 182a and the worm gear 183 are rotatably mounted to one of the brackets 184.

As shown in FIG. 3 and FIGS. 20A, 20B and FIG. 21, the actuating plate 100 has guide slots 101, 102 and 103 for receiving a shaft 25a of the first loading gear 25, a shaft 95b of the actuating gear 95 and a guide pin 104 fixedly mounted to the lower surface of base plate 1, respectively. By this construction, the actuating plate 100 is linearly laterally movable while being guided by the shafts 25a and 95b and the guide pin 104.

At the right upper portion of the upper surface of actuating plate 100, a first rack 111 is formed which is engaged with the smaller gear 97 of actuating gear 95.

With the above-mentioned construction, as the loading motor 90 drives, three functional parts, namely, the pinch drive assembly 50, the actuating plate 100 and the front loading housing 180 are simultaneously operated.

In other words, the rotation of the loading motor 90 Forces the first and second worms 92 and 94 to rotate. As the first worm 92 rotates, the worm gear 183 of front loading housing 180 engaged with the first worm 92 rotates, thereby causing the front loading housing 180 to be linearly moved. As the second worm 93 rotates, the actuating gear 95 engaged with the second worm 93rotates, so that the actuating plate 100 engaged with the actuating gear 95 can be operated. By the rotation of the actuating gear 95, the pinch roller actuating gear 98 engaged with the actuating gear 95 rotates, thereby causing the pinch drive assembly 50 to operate.

Since the three functional parts including the pinch drive assembly 50, the actuating plate 100 and the front loading housing 180 can be operated by the single loading motor 90 in accordance with the present invention, it is possible to obtain a light, thin, simple and compact construction and reduce the manufacture cost.

This construction capable of operatively connecting three different functional parts to the single loading motor has not been conventionally known.

The deck mechanism further includes a mode sensing switch unit 170 for sensing an operation mode of the deck mechanism. As shown in FIGS. 14A and 14B, the mode sensing switch unit 170 has a mode switch circuit board 171 fixedly mounted to the base plate 1 above the actuating gear 95 and a mode sensing annular rotation plate 172 received in an annular recess 95a provided at the upper surface of the actuating gear 95 to rotate together with the actuating gear 95. Over the mode sensing rotation plate 172, a mode sensing circuit board 174 is fixed to the mode switch circuit board 171 by means of a fixture 179.

The mode sensing circuit board 174 has a copper foil pattern whereas the mode sensing rotation plate 172 has a contact adapted to come into contact with the copper foil pattern of mode sensing circuit board 174 during a rotation of the mode sensing rotation plate 172. Accordingly, the mode sensing switch unit 170 can sense various operation modes respectively corresponding to various contact positions obtained between the copper foil pattern and the contact during the mode sensing rotation plate 172 rotates together with the actuating gear 95.

A connector 173 is connected to the mode sensing circuit board 174. In FIGS. 14A and 14B, the reference numeral 175 denotes a washer, 177 signal lines for connecting a signal connecting terminal provided at the mode sensing circuit board 174 to a terminal of the loading motor 90, and 178 signal lines for connecting the connector 173 to a control unit (not shown).

As shown in FIGS. 14A and 14B, all elements of the mode sensing switch and drive units including the loading motor 90, a plurality of power transmission gears, the actuating gear 95 and the mode sensing switch 170 are mounted on the mode switch circuit board 171. Therefore the mode sensing switch and drive units can be handled as a single assembly.

Although a conventional mode sensing switch unit driven by use of a separate gear, the mode sensing switch unit 170 of the present invention is driven by the operation of actuating gear 95. Accordingly, the present invention provides advantages of a light, thin, simple and compact construction and a reduction in manufacture cost.

Figure 20A:
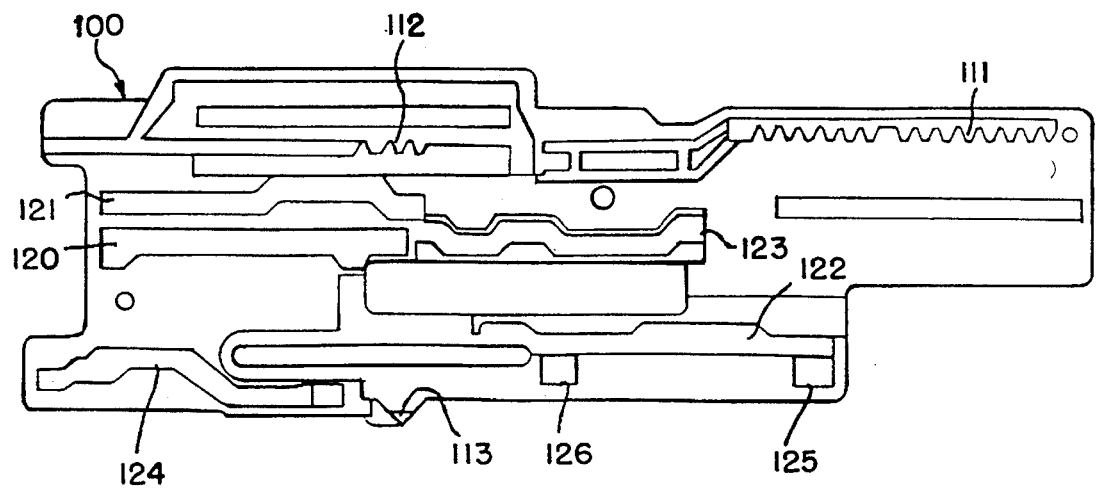
FIG. 20A is a plan view of the actuating plate.
Figure 20B:
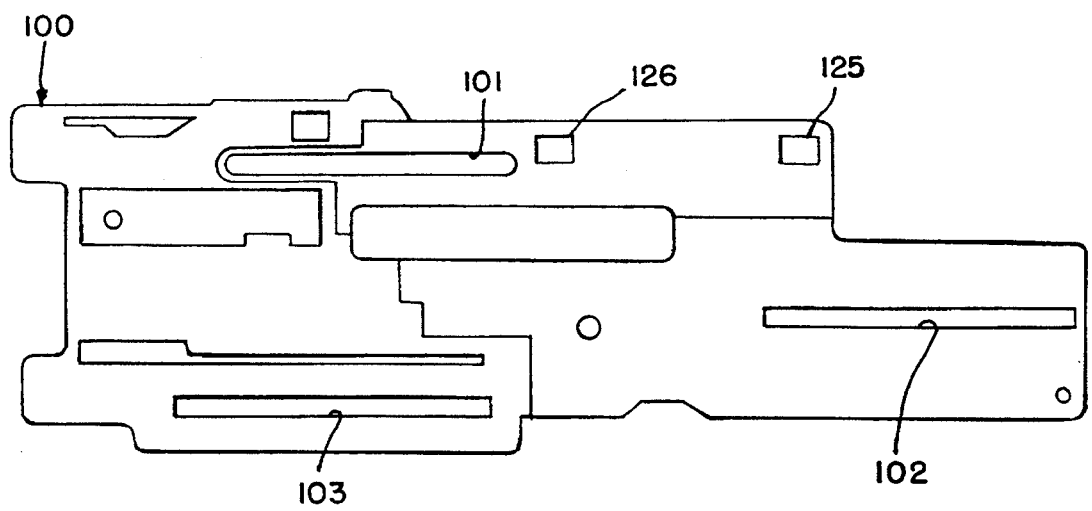
FIG. 20B is a bottom view of the actuating plate.
Figure 21:
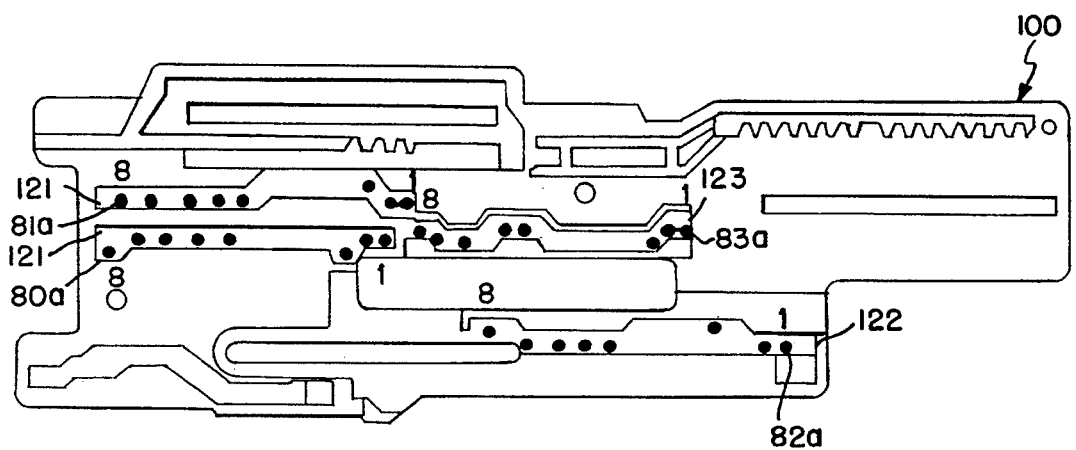

As shown in FIGS. 20A and 20B and FIG. 21, the actuating plate 100 has at the middle portion of the upper surface thereof a plurality of actuating grooves, namely, a supply-side main brake actuating groove 120, a supply-side soft brake actuating groove 121, a take-up-side main brake actuating groove 122, and a take-up-side soft brake actuating groove 123. These grooves 120, 121, 122 and 123 receive actuating protrusions 80a, 80b, 80c and 80d protruded from the supply-side main brake 80, the supply-side soft brake 81, the take-up-side main brake 82 and the take-up-side soft brake 83, respectively. By this construction, the lateral movement of the actuating plate 100 causes the supply reel 10 and the take-up reel 11 to be braked or released. The actuating plate is also at the left lower portion of the upper surface thereof with a middle lever actuating groove 124 for receiving an actuating protrusion 37 provided at the middle portion of the tension transmission lever 36. By this construction, the tension transmission lever 36 and the tension adjusting arm 31 are operatively connected to the actuating plate 100.

A second rack 112 is formed at the upper middle portion of the upper surface of actuating plate 100. The second rack 112 is engaged with the first loading gear 25 so that it rotates the first loading gear 25 and thus the second loading gear 26 when the actuating plate 100 moves laterally. By the rotations of the first and second loading gears 25 and 26, the slant post assemblies 20 connected to the loading gears 25 and 26 by the link type leading arms 24 are moved to their loading or unthreaded positions, respectively.

In conventional constructions, it is necessary for provisions of a cam gear for transmitting a motor power and a complicated transmission construction for transmitting a drive force of the cam gear to loading gears, in order to rotate the loading gear and thereby move slant post assemblies. In accordance with the present invention, however, the construction for driving the loading gears is very simple because the first loading gear 25 is driven by the second rack 112 of the actuating plate 100.

A third rack 113 is also provided at the middle portion of the lower edge of actuating plate 100. This third rack 113 is engaged with a jog clutch gear assembly 160 rotatably mounted to the bottom surface of the base plate 1 so as to prevent a tape from being loosened in a JOG mode. By this construction, the tape can maintain a uniform tension.

Figure 11:
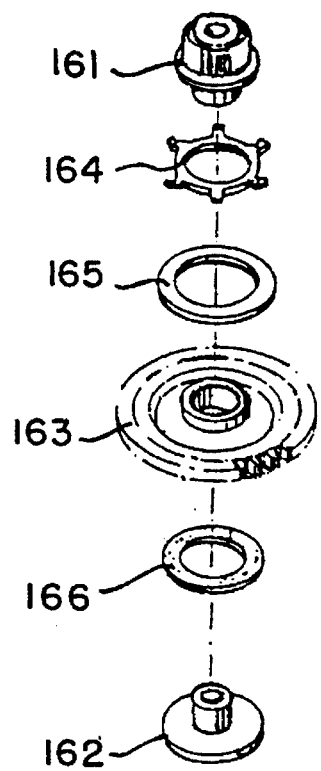
Figure 12:
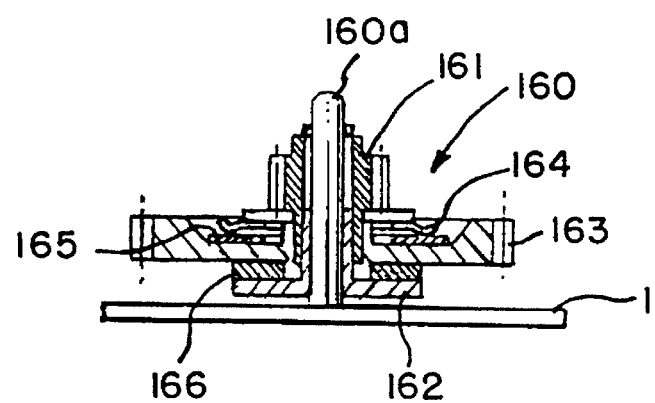
Figure 13:
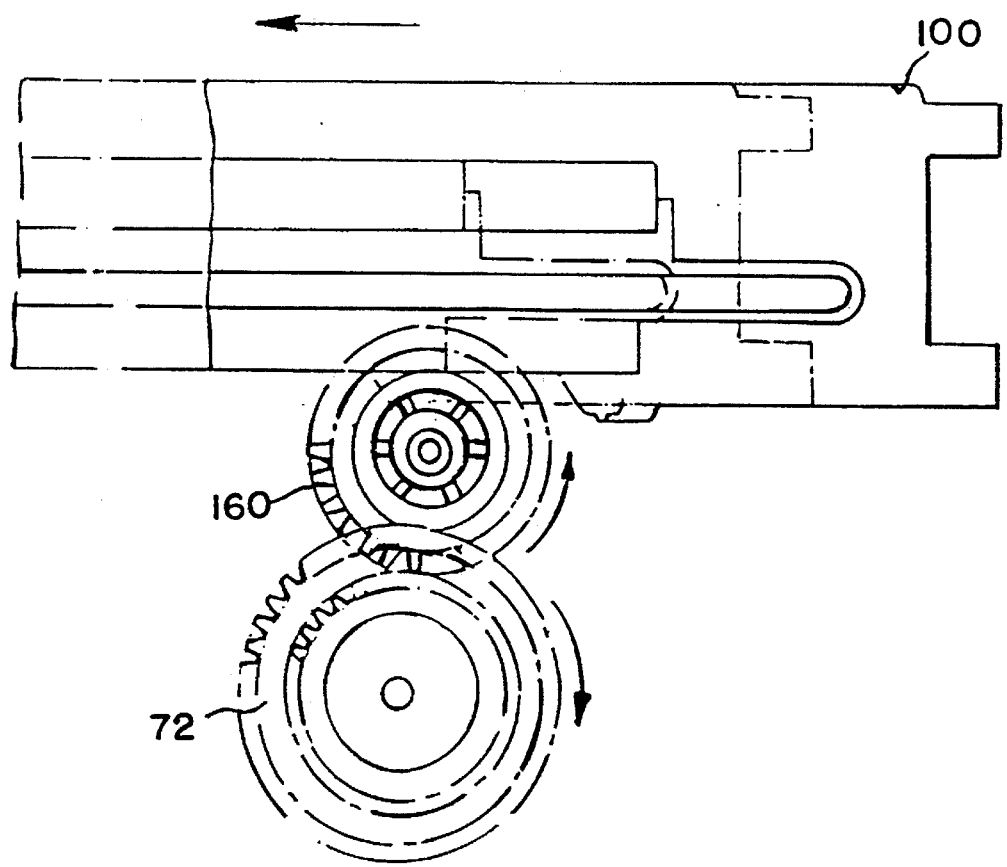

As shown in FIGS. 11 to 13, the jog clutch gear assembly 160 includes an input gear 161 and a holder 162 both rotatably mounted on a shaft 160a fixed to the base plate 1. The holder 162 has a hollow shaft portion fitted at its upper end in a hollow shaft portion of the input gear 161. Around the shaft portion of input gear 161, an output gear 163 is interposed between the input gear 161 and the holder 162. Felts 165 and 166 are interposed between the input gear 161 and the output gear 163 and between the output gear 163 and the holder 162, respectively. A plate spring 164 is disposed between the input gear 161 and the output gear 163.

As mentioned above, the pinch arm 60 has the pinch roller 62 rotatably mounted to one end, namely, the front end of the pinch arm 60 and a tape guide pin 63 mounted to the front end of the pinch arm 60 forwardly of the pinch roller 62. As the pinch arm 60 pivots by the pinch drive assembly 50 and comes into contact with the capstan shaft 41, the guide post 63 comes into contact with the back surface, namely, the surface opposite to the recording surface of the tape in one side of the capstan shaft 41. As a result, the tape is guided without a damage.

In conventional constructions, a guide post adapted to guide stable travel of the tape along a given travel path one side of the capstan shaft is fixedly mounted to the base plate. The conventional guide post guides the travel of tape under a condition that it is in contact with the recording surface of tape. As a result, the recording surface of tape may be worn and damaged due to a friction generated between the recording surface and the guide post. This results in a shortened life of tape and a noise in reproducing signals accordance with the present invention, however, a unique construction is provided in which the guide post 59 fixedly mounted to the front end of pinch arm 60 moves to its tape guide position together with the pinch arm 60 and comes contact with the back surface of tape at its tape guide position to guide the tape. As a result, it is possible prevent the tape from being damaged. This provides advantages of an extended life of tape and a maintenance of distinct reproducing signals.

To the other end of the pinch arm 60, the take-up arm 65 is connected at one end thereof, as mentioned above. To the other end of the take-up arm 65, the take-up post 66 is mounted.

Between the lower surface of base plate 1 and the actuating plate 100, a plate 150 for a fast winding mode is interposed to move laterally linearly.

Figure 8:
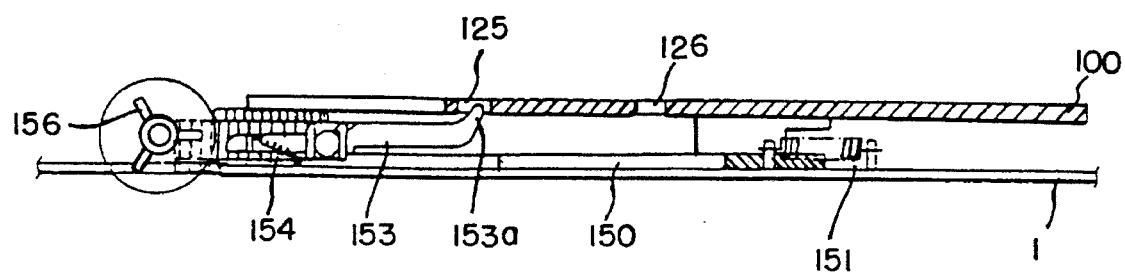
Figure 9A:
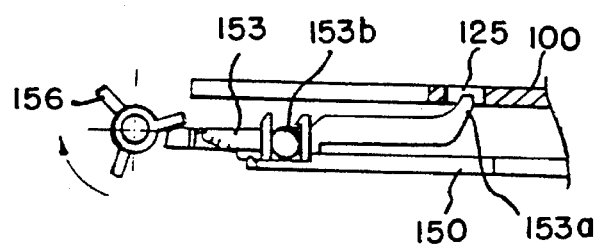
FIGS. 9A and 9B are views explaining the fast winding mode operation, respectively, wherein FIG. 9A explains a condition that a lock gear is engaged with a ratchet, and FIG. 9B explains a condition that the lock gear is disengaged from the ratchet.
Figure 9B:
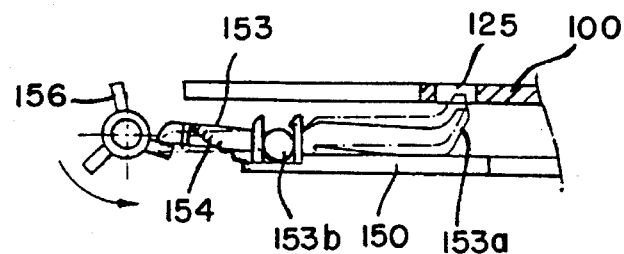
Figure 19:
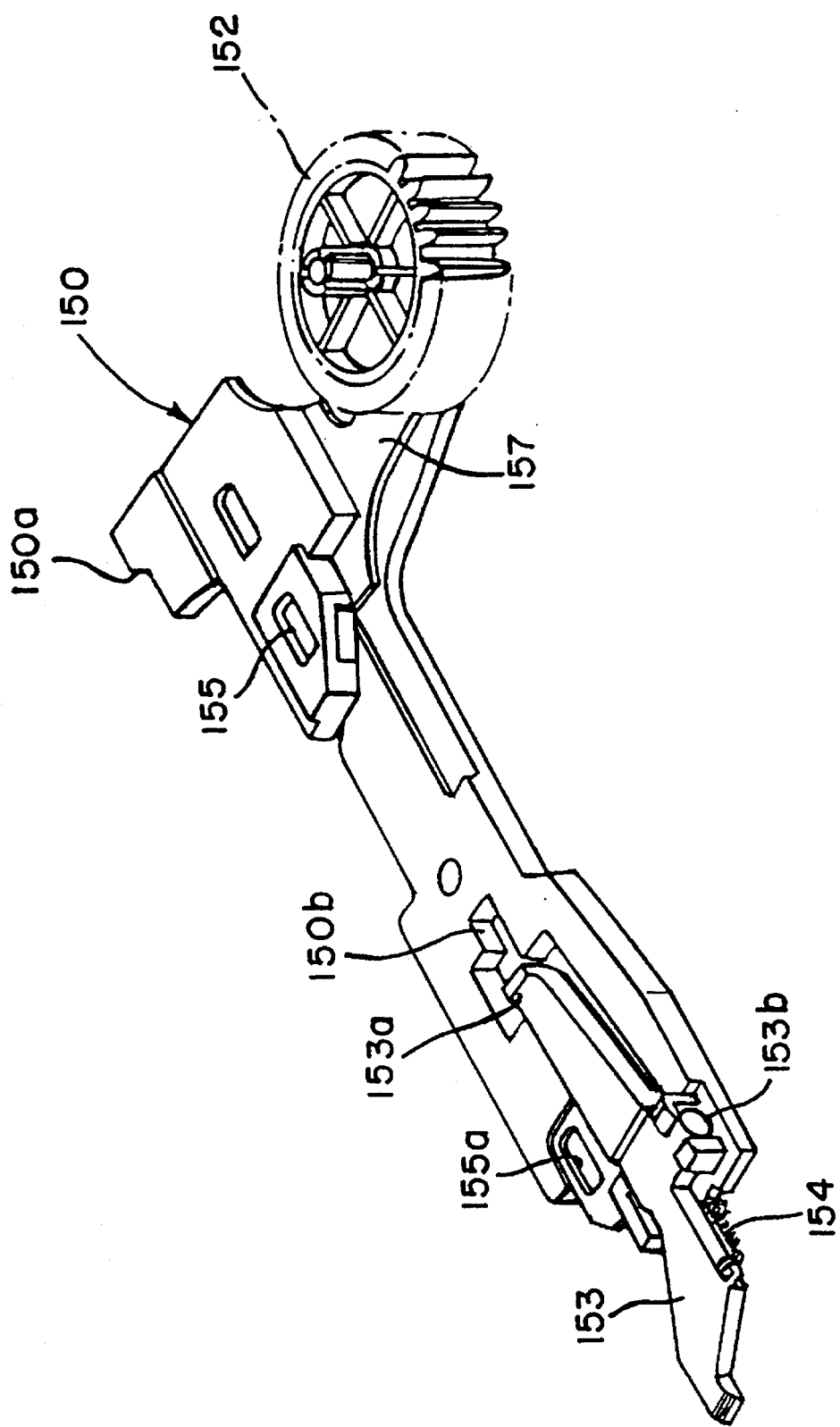

As shown in FIG. 8 and FIGS. 9A and 9B, the plate 150 is connected at one end thereof to one end of a tension coil spring 151 which is connected at the other end thereof to the base plate 1. By the tension coil spring 151, the plate 150 can return to its original position after completion of its operation in the fast winding mode. As shown in FIG. 19, the plate 150 also has an extension 157. To the end of the extension 157, a FF/REW gear 152 is rotatably mounted which is directly engaged with the idler mechanism 70 so as to transmit high speed power.

The FF/REW gear 152 is permitted to be engaged with the idler mechanism 70 at its tape threaded and unthreaded positions to perform the FF/REW mode.

A lock lever 153 is pivotally coupled to the other end of the fast winding plate 150 by means of an axial pin 153b. The lock lever 153 has a bent portion 153a at one end thereof. A tension coil spring 154 is connected between the plate 150 and the lock lever 153. For engaging with the bent portion 153a of lock lever 153, the actuating plate 100 has a first fast winding actuating groove 125 and a second fast winding actuating groove 126, as shown in FIG. 8.

The fast winding plate 150 further includes an actuating portion 150a for actuating the supply-side main brake 80 and an actuating portion 150b for actuating the take-up-side main brake 82.

Figure 22:
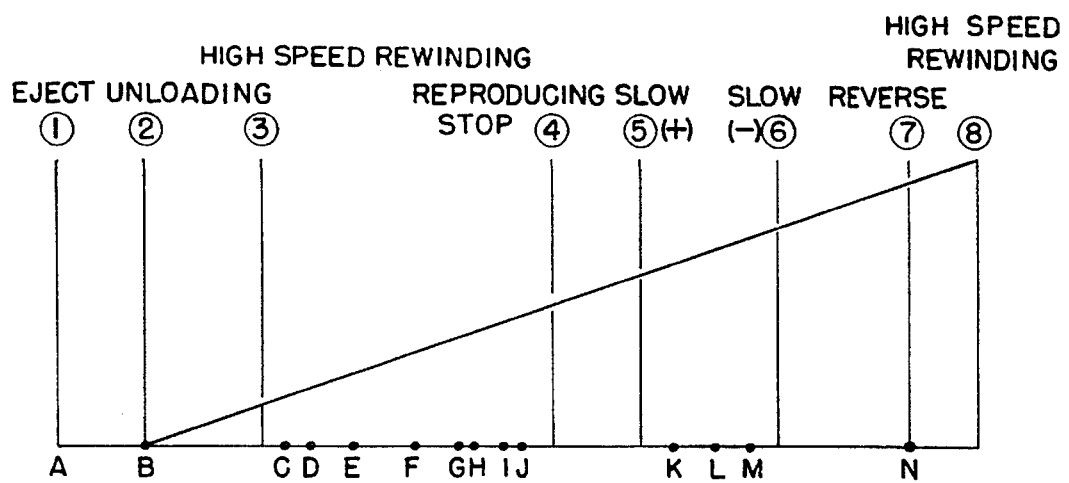

FIGS. 21 and 22 illustrate an example of an operation mode change in accordance with the present invention. FIG. 21 shows a condition that respective actuating protrusions 80a, 81a, 82a and 83a of the brakes 80, 81, 82 and 83 are received in corresponding actuating grooves 120, 121, 122 and 123 of the actuating plate 100. FIG. 22 is a graph showing the progress of operation modes. As shown in FIG. 22, the operation proceeds in the order of (1) eject mode→(2) unthreaded mode→(3) fast winding mode at unthreaded state→ (4) reproducing and stop mode→(5) and (8) slow mode→(7) rewinding mode→(8) fast winding mode at threaded state.

As shown in FIG. 22, the operation modes (1) to (4) are subdivided into a plurality of sub-modes proceeding in the order of A: front loading operation starting→B: tape cassette seating→C: take-up driving starting→D: threading starting→E: take-up driving ending and tape take-out and pinch roller lowering starting→F: pinch roller lowering ending→ G: threading ending and slant post assemblies pressing ending→H: pinch roller pressing starting→I: tension arm driving ending→J: pinch roller pressing ending. The operation modes (5) to (8) proceed in the order of K: pinch roller separating→L: tension arm separating→M: pinch roller pressing→N: pinch roller separating and tension arm separating. FIG. 21 shows respective positions of actuating protrusions 80a to 83a of brakes 80 to 83 corresponding to the operation modes (1) to (8) proceeding in the order shown in FIG. 22.

Of course, the deck mechanism of the present invention is not required to operate in the order shown in FIGS. 21 and 22. If desired, the operation modes may be changed.

When a tape cassette is inserted into the front loading housing 180 to be loaded at the unloaded state shown in FIGS. 2, 4 and 6 so as to perform a desired operation mode such as play mode, the loading motor 90 rotates in normal direction, thereby causing the first and second worms 92 and 94 to rotate. By the rotations of the first and second worms 92 and 94, the worm gear 183 of front loading housing 180 engaged with the first worm 92 rotates to move the front loading housing 180. As a result, the tape cassette is fed to the interior of the deck mechanism and then seated on both the supply reel and the take-up reel 11. At this time, the actuating gear 95 engaged with the second worm 94 rotates to move the actuating plate 100 engaged with the actuating gear 95. The movement of the actuating plate 100 results in a rotation of the first loading gear 25 engaged with the second rack 112 of actuating plate 100 and thus a rotation of the second loading gear 26. As the first and second loading gears 25 and 26 rotate, the slant post assemblies 20 connected to the loading gears 25 and 26 by the link type loading arms move toward the rotation head drum 3 while carrying the tape. The pinch roller actuating gear 98 engaged with the actuating gear 95 also rotates to drive the pinch drive assembly 50, thereby causing the pinch roller 62 and the take-up post 66 to move to respective threaded positions thereof. Thus threading of the tape is completed.

At this state, an operation mode such as play mode or reverse play mode can be performed while the tape is fed in normal or reverse direction by a frictional force generated by the capstan shaft 41 and the pinch roller 82 in rotation of the capstan motor 40. At this time, a selected one of the supply reel 10 and the take-up reel 11 is rotated by the drive power of the capstan motor 40 transmitted by the idler mechanism 70 via the belt 46.

When the tape is to be unloaded at the loaded state after completion of the operation mode such as play mode, the loading motor 90 rotates in reverse direction, thereby causing the first and second worms 92 and 94 to rotate reversely. By the reverse rotations of the first and second worms 92 and 94, the worm gear 183 of front loading housing 180 engaged with the first worm 92 rotates to move the front loading housing 180 in reverse direction. As a result, the tape cassette is fed outwardly from the interior of the deck mechanism so as to be ejected from the front loading housing 180. By the rotation of second worm 94, the actuating gear 95 rotates to move the actuating plate 100 engaged with the actuating gear 95. As a result, the first loading gear 25 and the second loading gear 26 rotate reversely, so that the slant post assemblies 20 move toward the supply reel 10 and the take-up reel 11, respectively. The pinch roller actuating gear 98 engaged with the actuating gear 95 also rotates to drive the pinch drive assembly 50, thereby causing the pinch roller 62 and the take-up post 66 to move to respective unthreaded positions thereof. Thus unthreading of the tape is completed.

When a fast winding operation is to be performed at the tape unthreaded state shown in FIG. 6, the actuating plate 100 is slightly moved in right direction by the drive power of the loading motor 90. At this time, the fast winding plate 150 moves in right direction together with the actuating plate 100 under a condition that the bent portion 153a of lock lever 153 is engaged in the first fast winding actuating groove 125. As a result, the FF/REW gear 152 mounted to the extension 157 of fast winding plate 150 is engaged with the idler mechanism 70, as shown in FIG. 7. At this time, the supply-side main brake 80 and the take-up-side main brake 82 are separated from the supply reel 10 and the take-up reel 11, by the actuating portions 150a and 150b of fast winding plate 150, respectively. As the FF/REW gear 152 is engaged with the idler mechanism 70, the drive power of capstan motor 40 can be directly transmitted to the FF/REW gear 152 so as to rotate the supply reel 10 or the take-up reel 11 at a high speed. Thus fast winding and rewinding can be performed.

Figure 10:
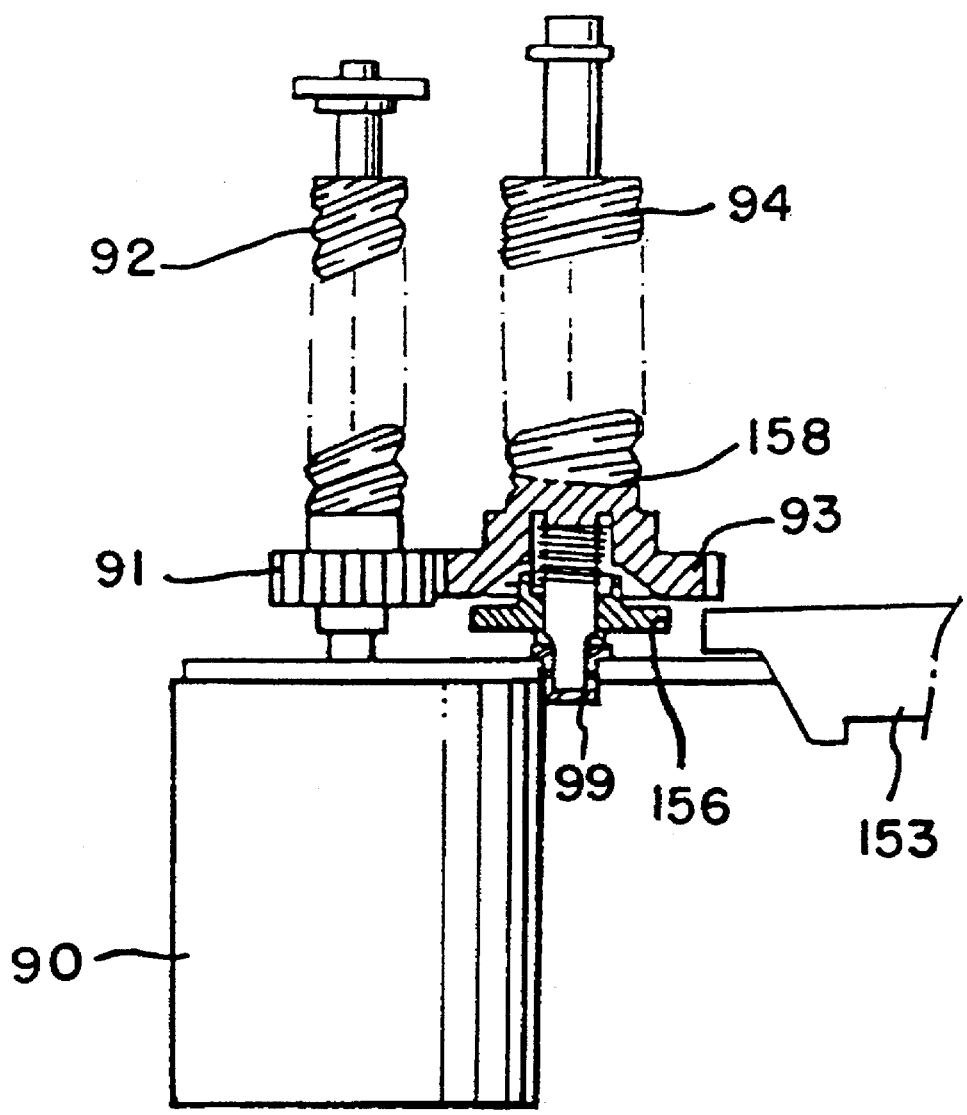

Beneath the second spur gear 93 integral with the second worm 94, a ratchet 156 for releasing the locked state of the lock lever 153 is mounted on a shaft portion of the second spur gear 93 by means of an one-directional clutch spring 158, as shown in FIG. 10. Upon stopping the fast winding operation, the ratchet 156 allows the supply-side main brake 80 and the take-up-side main brake 82 to perform a sudden braking operation.

In other words, when the loading motor 90 rotates slightly in reverse direction for stopping the tape fast winding operation, the second worm 94 and the second spur gear 93 rotates reversely, so that the ratchet 156 strikes the lock lever 153, as shown in FIG. 9B. As a result, the bent portion 153a of lock lever 153 is separated from the first fast winding actuating groove 125 of the fast winding plate 150, thereby causing the fast winding plate 150 to be separated from the actuating plate 100. When the fast winding plate 150 is separated from the actuating plate 100, it returns rapidly to its original position by virtue of the spring force of the tension coil spring 154. Accordingly, the actuating portions 150a and 150b of fast winding plate 150 are released from their states pressing the supply-side main brake 80 and the take-up-side main brake 82, respectively. As a result, the supply-side main brake 80 and the take-up-side main brake 82 brakes suddenly the supply reel 10 and the take-up reel 11, respectively.

When the fast winding operation is to be performed at the tape threaded state, the actuating plate 100 is slightly moved in right direction by the drive power of the loading motor 90. At this time, the fast winding plate 150 moves in right direction together with the actuating plate 100 under a condition that the bent portion 153a of lock lever 153 is engaged in the second fast winding actuating groove 126. As a result, the FF/REW gear 152 mounted to the extension 157 of fast winding plate 150 is engaged with the idler mechanism 70. At this time, the supply-side main brake 80 and the take-up-side main brake 82 are separated from the supply reel 10 and the take-up reel 11, by the actuating portions 150a and 150b of fast winding plate 150, respectively. As the FF/REW gear 152 is engaged with the idler mechanism 70, the drive power of capstan motor 40 can be directly transmitted to the FF/REW gear 152 so as to rotate the supply reel 10 or the take-up 11 at a high speed. Thus fast winding and rewinding can be performed.

For stopping the tape fast winding operation, the loading motor 90 rotates slightly in reverse direction. By this rotation, the second worm 94 and the second spur gear 93 rotates reversely, so that the ratchet 156 strikes the lock lever 153. As a result, the bent portion 153a of lock lever 153 is separated from the second fast winding actuating groove 126 of the fast winding plate 150, thereby causing the fast winding plate 150 to be separated from the actuating plate 100. When the fast winding plate 150 is separated from the actuating plate 100, it returns rapidly to its original position by virtue of the spring force of the tension coil spring 154. Accordingly, the actuating portions 150a and 150b of fast winding plate 150 are released from their states pressing the supply-side main brake 80 and the take-up-side main brake 82, respectively. As a result, the supply-side main brake 80 and the take-up-side main brake 82 brakes suddenly the supply reel 10 and the take-up reel 11, respectively.

Now, an operation in the jog mode will be described.

When a reverse feeling force is applied to the tape as the capstan shaft 41 rotates reversely in the play mode, the tape is loosened while the idler gear 73 is separated from the take-up reel 11 and then engaged with the supply reel 10. As a result, a noise is generated. In accordance with the present invention, when the actuating plate 100 moves slightly in right direction in the play mode, the third rack 113 of actuating plate 100 is engaged with the jog clutch gear assembly 160, thereby causing the jog clutch gear assembly 160 to rotate. The rotation of jog clutch gear assembly 160 results in a rotation of the idler mechanism 70 engaged in the jog clutch gear assembly 160. As the idler mechanism 70 rotates, the idler gear 73 is engaged with the supply reel 10, so that the supply reel 10 rotates slightly in reverse direction, thereby causing the tape to be taken up on the supply reel 10. Thus the loosening of the tape can be prevented.

As apparent from the above description, the present invention provides a mechanism capable of simultaneously operating the pinch drive assembly, the actuating plate 100 and the front loading housing 180 by the single loading motor 90. Accordingly, the present invention provides advantages of a light, thin, simple and compact construction and a reduction in manufacture cost.

Although a conventional mode sensing switch unit is driven by use of a separate gear, the present invention uses a mode sensing switch unit driven by the actuating gear 95. Accordingly, the present invention is more advantageous to provide a light, thin, simple and compact construction and a reduction in manufacture cost In conventional constructions, it is necessary for provisions of a cam gear for transmitting a motor power and a complicated transmission construction for transmitting a drive force of the cam gear to loading gears, in order to rotate the loading gear and thereby move slant post assemblies. In accordance with the present invention, however, the construction for driving the loading gears is very simple because the first loading gear 25 is driven by the second rack 112 of the actuating plate 100.

In accordance with the present invention, the gear portion 67 of the take-up arm 65 has the tooth 67a and a pair of arc-shaped contacts 67b and 67b disposed in both sides of the tooth 67a. By this construction of the gear portion 67, the take-up post 66 of the take-up arm 65 is moved through a predetermined angle and then maintained at the moved position when the pinch roller 62 of the pinch arm 60 moves to its tape threaded or unthreaded by a rotation of the pinch roller actuating gear 98. Accordingly, the construction for driving the take-up post 66 is simple.

The present invention also provides the third rack 113 at the middle portion of the lower edge of actuating plate 100 and the jog clutch gear assembly 160 rotatably mounted to the bottom surface of the base plate 1 and engaged with the third rack 113 so as to prevent a tape from being loosened in a JOG mode. Thus the present invention provides an advantage of compensating the loosening of tape by a simple construction.

The present invention also provides an unique construction including the pinch roller 82 and the guide post 59 mounted to the front end of the pinch arm 60. When the pinch arm 60 pivots by the pinch drive assembly 50 to come into contact with the capstan shaft 41, the guide post 59 moves to its tape guide position together with the pinch arm 60 and comes into contact with the back surface of tape at its tape guide position to guide the tape, thereby preventing the tape from being damaged. As a result, it is possible to extend the life of tape and reproduce video and audio signals without generating a noise. Accordingly, an improvement in performance of an appliance in which the mechanism of the present invention is employed can be obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A video cassette tape recorder having a base plate and a rotation head drum for recording video and audio signals on a magnetic tape and reproducing the recorded signals, comprising:

a supply reel and a take-up reel rotatably mounted on said base plate;

a single loading motor fixedly mounted to the base plate and adapted to generate a force for both loading a cassette and threading the tape;

mode switch means for sensing an operation mode and controlling said single loading motor according to the sensed operation mode;

an actuating plate is drivingly connected to said single loading motor;

a pair of slant post assemblies for guiding the tape out of a tape cassette, each of said slant post assemblies having a slant post and a guide roller;

a pair of link type loading arms connected between said slant post assemblies and a pair of loading gears which are driven by said actuating plate, whereby each of said slant post assemblies are moved between a tape threaded position and a tape unthreaded position;

a capstan motor and a pinch drive assembly disposed on said base plate for feeding the tape, said pinch drive assembly being driven by said single loading motor and including a pinch roller for pressing the tape against a capstan shaft of said capstan motor;

idler means, in connection with said capstan motor, for rotating said supply reel and said take-up reel;

brake means for braking the supply reel and the take-up reel;

means for initiating a fast winding operation mode for winding the tape at a high speed in response to movement of the actuating plate to a predetermined position, said means for initiating including a fast winding plate engageable and disengageable with said actuating plate and means for engaging said idler means when said fast winding plate is engaged with said actuating plate to thereby rotate the supply reel and the take-up reel at a high speed; and a front loading housing operatively connected with said single loading motor to move said tape cassette between a tape cassette loading position and a tape cassette unloading position.

2. A video cassette tape recorder in accordance with claim 1, wherein said actuating plate is mounted on a lower surface of the base plate to linearly laterally move between said supply reel and said take-up reel both mounted on a front portion of the base plane, said pinch drive assembly disposed on one side of the take-up reel and adapted to drive said pinch roller, and said front loading housing.

3. A video cassette tape recorder in accordance with claim 1, further comprising:

a first spur gear provided on a shaft of said loading motor;

a first worm integral with said first spur gear, said first worm being operatively connected with said front loading housing;

a second spur gear provided at a shaft mounted to said base plate disposed in parallel to said shaft of the loading motor, said second spur gear being engaged with said first spur gear; and a second worm integral with the second spur gear.

4. A video cassette tape recorder in accordance with claim 3, wherein said second worm is disposed between said base plate and said actuating plate and engaged with an actuating gear rotatably mounted to a lower surface of the base plate, said actuating gear having a larger gear and a smaller gear integral with said larger gear.

5. A video cassette tape recorder in accordance with claim 4, wherein said smaller gear of the actuating gear has teeth partially formed at a circumferential surface of the smaller gear and operatively connected with said actuating plate, and said larger gear of the actuating gear is operatively connected with said pinch drive assembly.

6. A video cassette tape recorder in accordance with claim 3, further comprising a guide post mounted to one end of a pinch arm supporting said pinch roller and adapted to guide a back surface of said tape in one side of said capstan shaft.

7. A video cassette tape recorder in accordance with claim 1, wherein said base plate has an upper bent portion supporting a pulley gear for transmitting a force of said capstan motor and a lower bent portion supporting an idler mechanism adapted to rotate both the supply reel and the take-up reel.

8. A video cassette tape recorder in accordance with claim 1, wherein said mode switch means comprises:

a mode switch circuit board fixedly mounted to said base plate above an actuating gear rotatably mounted on a lower surface of the base plate, said mode switch circuit board supporting said loading motor and a plurality of power transmission gears;

a mode sensing annular rotation plate received in an annular recess provided at the upper surface of the actuating gear to rotate together with the actuating gear;

a mode sensing circuit board fixed to said mode switch circuit board over said mode sensing rotation plate; and a connector connected to said mode sensing circuit board.

9. A video cassette tape recorder in accordance with claim 1, wherein said actuating plate has a plurality of guide slots for receiving a shaft of one of said loading gears, a shaft of an actuating gear and a guide pin fixedly mounted to a lower surface of said base plate, respectively, so as to be linearly laterally movable while being guided by said shafts and said guide pin, and a first rack engaged with a smaller gear of said actuating gear.

10. A video cassette tape recorder in accordance with claim 1, wherein said actuating plate has at a middle portion of the upper surface thereof a supply-side main brake actuating groove, a supply-side soft brake actuating groove, a take-up-side main brake actuating groove, and a take-upside soft brake actuating groove respectively receiving actuating protrusions protruded from a supply-side main brake, a supply-side soft brake, a bake-up-side main brake and a take-up-side soft brake of said brake means, whereby a lateral movement of the actuating plate causes said supply reel and said take-up reel to be braked or released.

11. A video cassette tape recorder in accordance with claim 9, wherein said actuating plate has at a left lower portion of the upper surface thereof a middle lever actuating groove for receiving an actuating protrusion provided at a middle portion of a tension transmission lever.

12. A video cassette tape recorder in accordance with claim 9, wherein said actuating plate has at a middle portion of the upper surface thereof a second rack engaged with said one of said loading gears.

* * * * *